US008619594B2

(12) United States Patent
Meloche

(10) Patent No.: US 8,619,594 B2
(45) Date of Patent: Dec. 31, 2013

(54) SYSTEM AND METHOD FOR COMPARING PACKET TRACES FOR FAILED AND SUCCESSFUL COMMUNICATIONS

(75) Inventor: Jean Meloche, Madison, NJ (US)

(73) Assignee: Avaya Inc., Basking Ridge, NJ (US)

(*) Notice: Subject to any disclaimer, the term of this patent is extended or adjusted under 35 U.S.C. 154(b) by 601 days.

(21) Appl. No.: 12/533,483

(22) Filed: Jul. 31, 2009

(65) Prior Publication Data
US 2011/0026410 A1 Feb. 3, 2011

(51) Int. Cl.
G01R 31/08 (2006.01)
H04L 1/00 (2006.01)

(52) U.S. Cl.
USPC ........... 370/244; 370/250; 370/252; 370/249; 370/254; 709/238; 709/400

(58) Field of Classification Search
USPC .............. 370/244, 250, 252, 395.1, 251, 248, 370/249, 254; 714/39, 715; 703/13; 375/222; 379/22.01, 27.03; 709/238, 709/400
See application file for complete search history.

(56) References Cited

U.S. PATENT DOCUMENTS

| 6,243,454 | B1 | 6/2001 | Eslambolchi |
| 6,411,923 | B1 | 6/2002 | Stewart et al. |
| 6,542,504 | B1 | 4/2003 | Mahler et al. |
| 6,760,345 | B1 | 7/2004 | Rosengard |
| 6,775,240 | B1 | 8/2004 | Zhang et al. |
| 7,136,359 | B1 | 11/2006 | Coile et al. |
| 7,173,910 | B2 | 2/2007 | Goodman |
| 7,203,173 | B2 | 4/2007 | Bonney et al. |
| 7,340,529 | B1 | 3/2008 | Yazaki et al. |
| 2001/0050903 | A1* | 12/2001 | Vanlint .................. 370/252 |
| 2002/0012388 | A1* | 1/2002 | Eldumiati et al. ............ 375/222 |
| 2002/0021680 | A1 | 2/2002 | Chen |
| 2002/0057690 | A1 | 5/2002 | Kingsley |
| 2002/0191614 | A1 | 12/2002 | Ido et al. |
| 2002/0193999 | A1 | 12/2002 | Keane et al. |

(Continued)

FOREIGN PATENT DOCUMENTS

| EP | 1763193 A1 | 3/2007 |
| EP | 1228619 B1 | 2/2008 |
| WO | WO 2006/065863 A2 | 6/2006 |
| WO | WO 2007/036786 A2 | 4/2007 |

OTHER PUBLICATIONS

Network Instruments, "VoIP Analysis, Manage, Monitor, and Maintain VoIP Communications Across Enterprise Networks with Observer," 2006, Product Brochure, U.S.

(Continued)

Primary Examiner — Andrew Chriss
Assistant Examiner — Jamal Javaid
(74) Attorney, Agent, or Firm — Sheridan Ross P.C.

(57) ABSTRACT

The system and method get a packet trace for a failed communication and a packet trace for a successful communication. The two packet traces are generated with packets from a common protocol(s) shared by the two communications. The failed and successful communications have at least some network elements in common. A field(s) in the common protocol(s) is identified. The field(s) is updated to be the same in both packet traces. The two packet traces are then compared to produce a list of remaining differences that can be used to diagnose problems in the failed communication. The list can also be compared to bills of materials for the failed and successful communications to further enhance diagnosis of the failed communication.

27 Claims, 5 Drawing Sheets

(56) References Cited

U.S. PATENT DOCUMENTS

| | | |
|---|---|---|
| 2003/0086425 A1 | 5/2003 | Bearden et al. |
| 2003/0165162 A1 | 9/2003 | Westphal |
| 2004/0052216 A1 | 3/2004 | Roh |
| 2004/0172464 A1 | 9/2004 | Nag |
| 2005/0041660 A1 | 2/2005 | Pennec et al. |
| 2006/0215596 A1 | 9/2006 | Krishnaswamy et al. |
| 2006/0218447 A1* | 9/2006 | Garcia et al. .............. 714/39 |
| 2006/0227714 A1 | 10/2006 | Griffin et al. |
| 2007/0081471 A1 | 4/2007 | Talley, Jr. et al. |
| 2007/0086336 A1 | 4/2007 | Richards et al. |
| 2007/0252695 A1 | 11/2007 | Bhavani |
| 2007/0286351 A1 | 12/2007 | Ethier et al. |
| 2009/0073906 A1 | 3/2009 | Yi et al. |
| 2009/0219825 A1 | 9/2009 | Denby |
| 2009/0268622 A1 | 10/2009 | Blum et al. |
| 2009/0290600 A1* | 11/2009 | Tatsuta et al. .............. 370/476 |
| 2010/0027429 A1* | 2/2010 | Jorgens et al. .............. 370/250 |
| 2010/0080150 A1 | 4/2010 | Steiner |

OTHER PUBLICATIONS

Fluke Networks, webpage entitled "Visual Performance Manager for Application Performance Management—Fluke Networks," website: http://www.flukenetworks.com/fnet/en-us/products/Visual+Performance+Manager/Overview . . ., Mar. 13, 2009, 2 pages.

Meloche, Jean, U.S. Appl. No. 12/433,630, entitled "System and Method for Monitoring a Network Communication at Multiple Network Layers," filed Apr. 30, 2009, 33 pages.

Meloche, Jean, U.S. Appl. No. 12/410,980, entitled "System and Method for Sending Packets Using Another Device's Network Address," filed Mar. 25, 2009, 19 pages.

Meloche, Jean, U.S. Appl. No. 12/434,265, entitled "System and Method for Testing a Dynamic Communication Across a Network," filed May 1, 2009, 31 pages.

Meloche, Jean, U.S. Appl. No. 12/436,651, entitled "Intelligent Multi-Packet Header Compression," filed May 6, 2009, 26 pages.

Meloche, Jean, U.S. Appl. No. 12/622,840, entitled "Detection and Display of Packet Changes in a Network," filed Nov. 20, 2009, 27 pages.

* cited by examiner

SYSTEM AND METHOD FOR COMPARING PACKET TRACES FOR FAILED AND SUCCESSFUL COMMUNICATIONS

TECHNICAL FIELD

The system and method relates to testing packet communications and in particular to determining differences between successful and failed communications.

BACKGROUND

Currently, there are a variety of systems that can analyze a packet trace of a communication. Today in video, voice, and data communications, the number of packets in a packet trace of the communication can be very large. The problem with large packet traces is trying to identify potential problems; the number of packets to view and analyze can become overwhelming. This is especially true when trying to compare the packet trace of a successful communication to the packet trace of an unsuccessful communication on similar, but not identical, communication systems/paths. This problem is exacerbated when different fields in the protocols that are used to send the packets change slightly based on different configurations in the network and/or different communication paths. Just trying to compare the differences in the packet traces of a successful communication and a failed communication can become daunting.

For example, U.S. Pat. No. 6,775,240 discloses a system that can compare the same test signal on a network path with a known quality and a network path with an unknown quality. Differences of specific network characteristics relating to quality of service, such as delay, are compared to help determine the quality of service of the network path with the unknown quality. This solution is useful when you are looking at specific known characteristics using the same signal. However, this solution falls short when the sent signal varies for each communication and if there are failures which are unexpected or caused by other characteristics; having to look at the differences in two different packet traces without knowing specifically what the error is and/or at what layer in the various protocols the error is can become difficult, if not impossible, to diagnose. This is because there are almost always differences in each packet, even though a similar communication is taking place on a similar network path.

SUMMARY

The system and method are directed to solving these and other problems and disadvantages of the prior art. The system and method get a packet trace for a failed communication and a packet trace for a successful communication. The two packet traces are generated with packets from a common protocol(s) shared by the two communications. The failed and successful communications also share at least one common element (e.g., network elements, communication devices, etc.). A field(s) in the common protocol(s) is identified. The field(s) is changed to be the same in the packet traces. The two packet traces are then compared to produce a list of differences that can be used to diagnose problems in the failed communication. The list can also be compared to bills of materials for the failed and successful communications to further enhance diagnosis of the failed communication.

BRIEF DESCRIPTION OF THE DRAWINGS

These and other features and advantages of the system and method will become more apparent from considering the following description of an illustrative embodiment of the system and method together with the drawings, in which.

DETAILED DESCRIPTION

Figure 1:
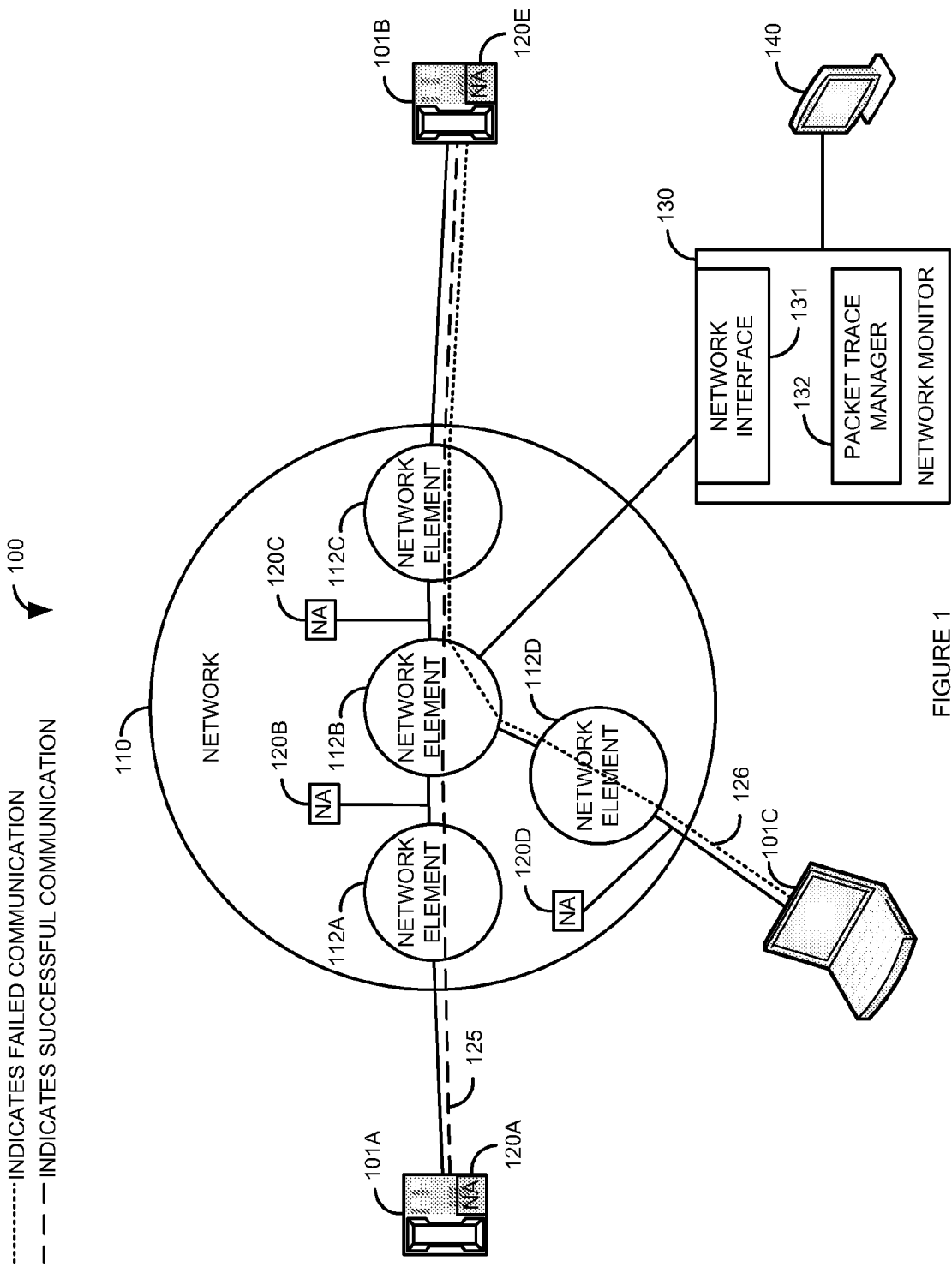
FIG. 1 is a block diagram of a first illustrative system for comparing different communications.

FIG. 1 is a block diagram of a first illustrative system 100 for comparing different communications. The system 100 comprises communication devices 101, a network 110, network analyzers (NAs) 120, a network monitor 130, and a display 140. The communication devices 101 can be any device capable of sending and receiving packets such as a telephone, a cellular telephone, a video camera, a Personal Computer (PC), a server, a Personal Digital Assistant (PDA), and the like.

The network analyzer(s) 120 can be any device capable of monitoring packets. For example, U.S. patent application Ser. Nos. 12/436,651 and 12/410,980, which are incorporated herein by reference, disclose an example of a network analyzer 120; these systems disclose a way of capturing packet traces and sending them to a network monitor 130. The network analyzers 120 can modify a packet trace before sending the packet trace to the network monitor 130. For example, a network analyzer 120 can change a checksum to a 0 if successful and to a 1 if the checksum is bad. The network analyzer 120 can be embedded into a communication device 101 (e.g., network analyzers 120A and 120E embedded in communication devices 101A and 101B), within the network 110 (e.g., network analyzer 120B-120D), attached to a communication trunk (e.g., network analyzer 120D), and the like.

The network monitor 130 can be any device capable of receiving information such as a server, a PC, and the like. The network monitor 130 further comprises a network interface 131 and a packet trace manager 132. The network interface 131 can be any device/software capable of sending and receiving packets such as a network card, a USB interface, a wireless network card, and the like. The packet trace manager 132 can be any device/software capable of managing packet trace data such as a microprocessor, a threaded application, an operating system, and the like. The display 140 can be any type of display capable of displaying information, such as a video monitor, a television, and the like.

The network 110 can be any type of network such as the Internet, a Wide Area Network (WAN), a Local Area Network (WAN), a cellular network, the Public Switched Telephone Network (PSTN) and the like. Besides network analyzers 120, the network 110 further comprises network elements 112. A network element 112 can be any type of device involved in network communications, such as a server, a switch, a router, a central office switch, a Private Branch Exchange (PBX), a bridge, a software application, a trunk, the network 110, and the like.

The network interface 131 gets a packet trace from a network analyzer 120 for a failed communication 126. In this illustrative example, the failed communication 126 is between communication device 101C and communication device 101B. The failed communication can occur for a variety of reasons such as a lost connection, network congestion, network mismatches, firewall configurations, and the like. The packet trace for the failed communication 126 can be taken by any of the network analyzers (120D, 120C, and/or 120E) along the communication path for the failed communication 126. Ideally, the network analyzers 120 would be in the communication devices 101 and at layer 7 network elements 112. However, the network analyzers 120 can be in any device/element or on any network path. The packet trace for the failed communication can comprise packet traces of more than one of the network analyzers (120D, 120C, and/or 120E) along the communication path for the failed communication 126.

The network interface 131 also gets a packet trace from a network analyzer 120 for a successful communication 125. In this illustrative example, the successful communication 125 is between communication device 101A and communication device 101B. The packet trace for the successful communication 125 could be taken by any of the network analyzers (120A, 120B, 120C, and/or 120E) along the communication path for the failed communication 125. The packet trace for the successful communication can comprise packet traces of more than one of the network analyzers (120A, 120B, 120C, and/or 120E) along the communication path for the successful communication 125.

The failed communication and the successful communication can be any type of communication, such as a voice communication, a video communication, a data communication, a bridged audio communication, a bridged video communication, and the like. The failed communication and the successful communication can be between a communication device 101 and a network element 112, such as a bridge or server, between the same communication devices 101, and the like. The failed communication and the successful communication can be a live or recorded video and/or audio stream. The failed communication and the successful communication typically use one or more common elements, but not all common elements. However, the failed communication and the successful communication can use all the same elements. An element can be a network element 112, a communication device 101, the network monitor 130, and the like. In this illustrative example, the common elements for the failed communication and the successful communication are network element 112B, network element 112C, and communication device 101B. The elements that are not common to the failed communication and the successful communication are communication device 101A, network element 112A, network element 112D, and communication device 101C.

The packet trace for the failed communication and the packet trace for the successful communication are both generated from packets that use a common protocol(s). The common protocol(s) could, for example, be any layer of a layered protocol (e.g., the Open System Interconnect 7 layer model). The common protocol(s) could be any one of a variety and/or of combinations of protocols such as Internet Protocol (IP), User Datagram Protocol (UDP), Transmission Control Protocol (TCP), File Transfer Protocol (FTP), Hypertext Transfer Protocol (HTTP), Session Initiation Protocol (SIP), H.323, Integrated Services Digital Network (ISDN), a video protocol, Real-time Transport Protocol (RTP), Real-Time Streaming Protocol (RTSP), and the like.

The packet trace manager 132 identifies a field(s) in the common protocol(s). The field that is identified can be identified based on the field being less likely to identify the cause of the failed communication, based on the protocol, based on a network layer, and the like. The packet trace manager 132 can identify the field(s) in the common protocol(s) in a variety of ways, such as from a profile, from a user, from a network analyzer 120, and the like. Which fields are identified is typically protocol dependent. For example, in TCP the sequence number and the acknowledgement number change on every packet, but this changing is not likely an indication of an error and can thus typically be eliminated as a likely cause to identify a potential packet error. On the other hand, an indication that a checksum/Cyclic Redundancy Check (CRC) is successful or unsuccessful would probably be more likely to indicate a potential root cause of the failed communication. Fields such as timestamps at layer 7 are typically not relevant, and may be eliminated.

The packet trace manager 132 changes the identified field(s) in the packet trace of the failed communication and the packet trace of the successful communication to be the same. This can be done in a variety of ways, such as by removing the field(s) in the packet trace of the failed communication and the packet trace of the successful communication, replacing the field(s) in the packet trace of the failed communication and the packet trace of the successful communication with an identical value, and the like. The intent is to eliminate or hide differences that are not significant for determining the cause(s) of the failed communication. The changes are tracked because the changes constitute a list of differences between the successful and unsuccessful communications. The packet trace manager 132 compares the changed packet trace of the failed communication and the changed packet trace of the successful communication to produce a listing of the remaining differences between the two packet traces. Since the identified field(s) has been made the same, the differences between the first and second packet trace are reduced to those that are more likely to identify the cause of the failure. The identified field can be based on a field that is likely to identify the failed communication or some other method. The list of remaining differences then can be displayed to a user via the display 140. This makes it easier for the user to determine the root cause of the failed communication.

The list of remaining differences can be further reduced by analyzing the listing of differences based on additional criteria. For example, eliminating the same types of packets with different time stamps/time differences as long as their delays are within acceptable parameters for the protocol being analyzed. Other criteria for reducing the listing of remaining differences could be used to eliminate previously determined irrelevant errors, duplicate packets, and payload differences (e.g., voice payload in RTP packets).

Figure 2:
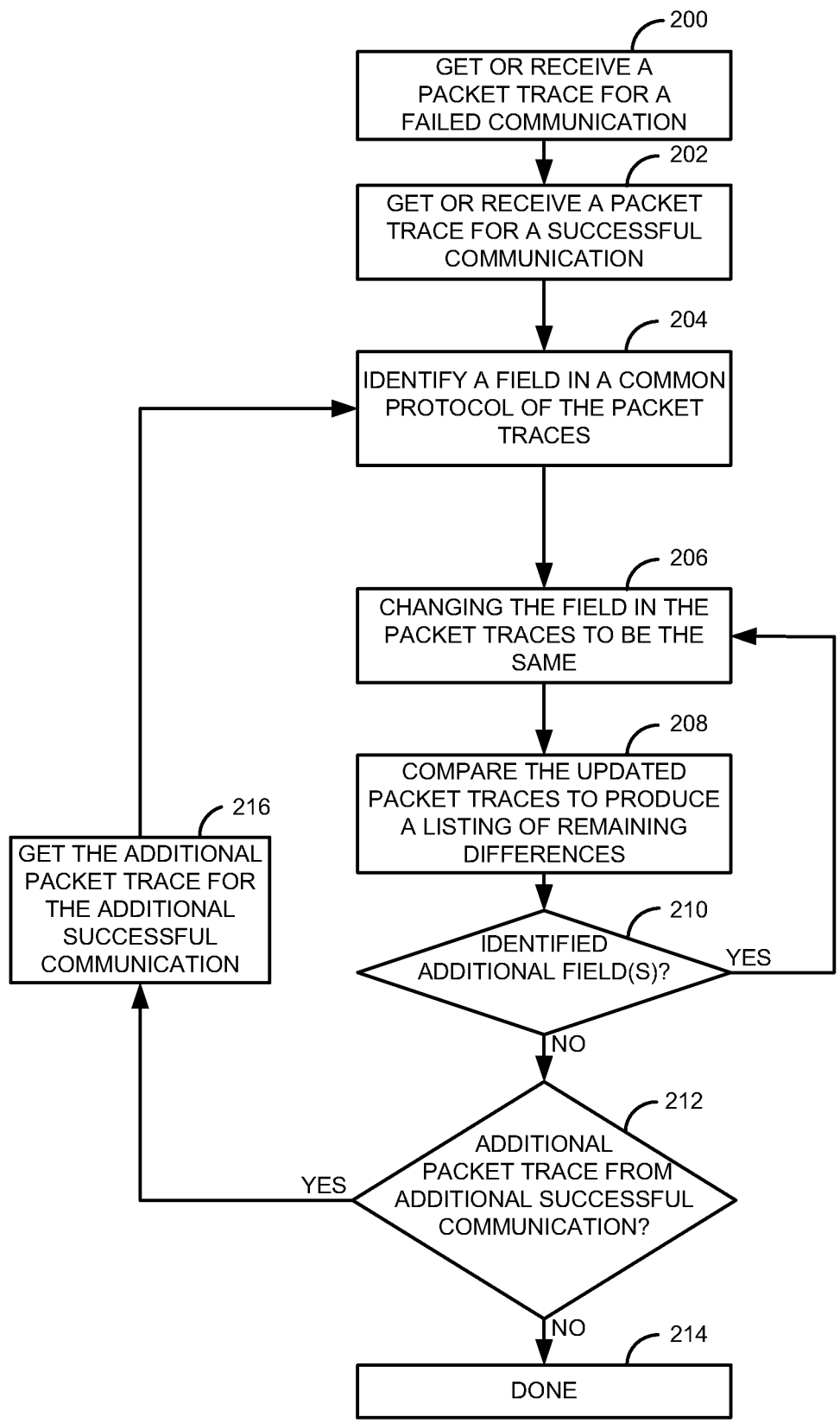
FIG. 2 is a flow diagram of a method for comparing different communications.

FIG. 2 is a flow diagram of a method for comparing different communications. Illustratively, the communication devices 101, the network elements 112, the network analyzers 120, and the network monitor 130 are stored-program-controlled entities, such as a computer, which perform the methods of FIGS. 2-5 by executing a program stored in a storage medium, such as a memory or disk.

The process begins when the network interface 131 gets 200 a packet trace for a failed communication. The network interface 131 can get the packet trace for the failed communication from a network analyzer 120, from a database of packet traces (not shown), and the like. The network interface 131 also gets or receives 202 a packet trace for a successful communication. The packet trace for the successful communication could be from the same network analyzer 120, from the same packet database, a different network analyzer 120, a different packet database, and/or the like. The packet trace of the failed communication and the packet trace of the successful communication are both generated from packets that use a common protocol(s). The failed communication and the successful communication typically use a common element(s) of the system 100 (e.g., the network element 112 or the communication device 101), and some elements that are not common element(s). However, all elements may be the same.

The packet trace manager 132 identifies 204 a field of the common protocol(s) in the packet trace of the failed communication and the packet trace of the successful communication. The packet trace manager 132 changes 206 this field in the packet traces of the failed communication and the packet trace of the successful communication to be the same. The packet trace manager 132 then compares 208 the changed packet trace of the failed communication and the changed packet trace of the successful communication to produce a listing of the remaining differences between the packet trace of the failed communication and the packet trace of the successful communication.

The process determines 210 if there are any identified additional fields in the common protocol(s). If there is an additional identified field(s), the process returns to step 206. Otherwise, if there is not any additional identified field(s), the network monitor 130 determines 212 if there are additional packet trace(s) from additional successful communication(s). If there are additional packet trace(s) from additional successful communication(s) in step 212, the process gets 216 one of the additional packet traces for an additional successful communication and the process returns to step 204 and repeats steps 204-210 using the additional packet trace. Otherwise, if there are no additional packet trace(s) from additional successful communication(s) in step 212, the process is done 214.

Figure 3:
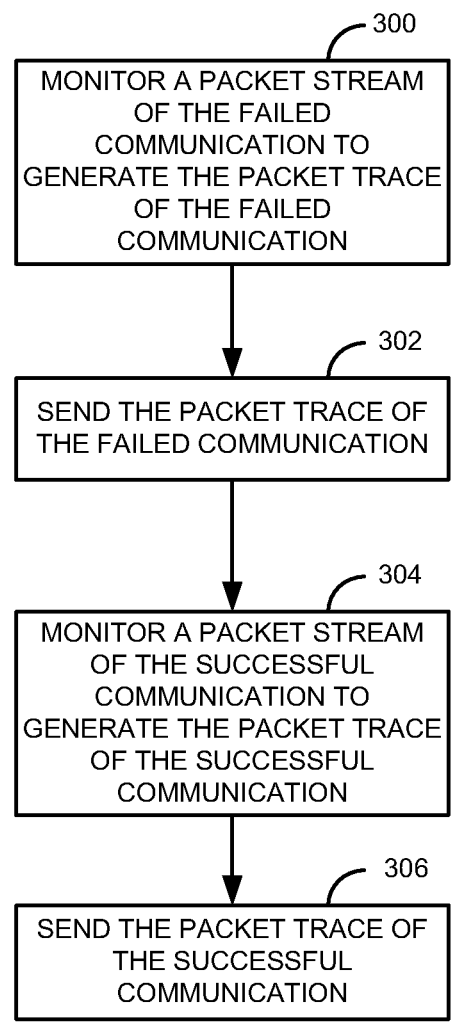
FIG. 3 is a flow diagram of a method for getting packet traces of different communications in order to compare the different communications.

FIG. 3 is a flow diagram of a method for getting packet traces of different communications in order to compare the different communications. A network analyzer 120 monitors 300 a packet stream of a failed communication to generate the packet trace of the failed communication. The network analyzer 120 sends 302 the packet trace of the failed communication to the network interface 131. The network analyzer 120 monitors 304 a packet stream of a successful communication to generate the packet trace of the successful communication. The network analyzer 120 in step 300 can be the same network analyzer 120 as in step 304 or a different network analyzer 120; the network analyzer 120 in step 300 can be monitoring a different point in the network 110 than the network analyzer 120 in step 304. The network analyzer 120 sends 306 the packet trace of the successful communication to the network interface 131.

Figure 4:
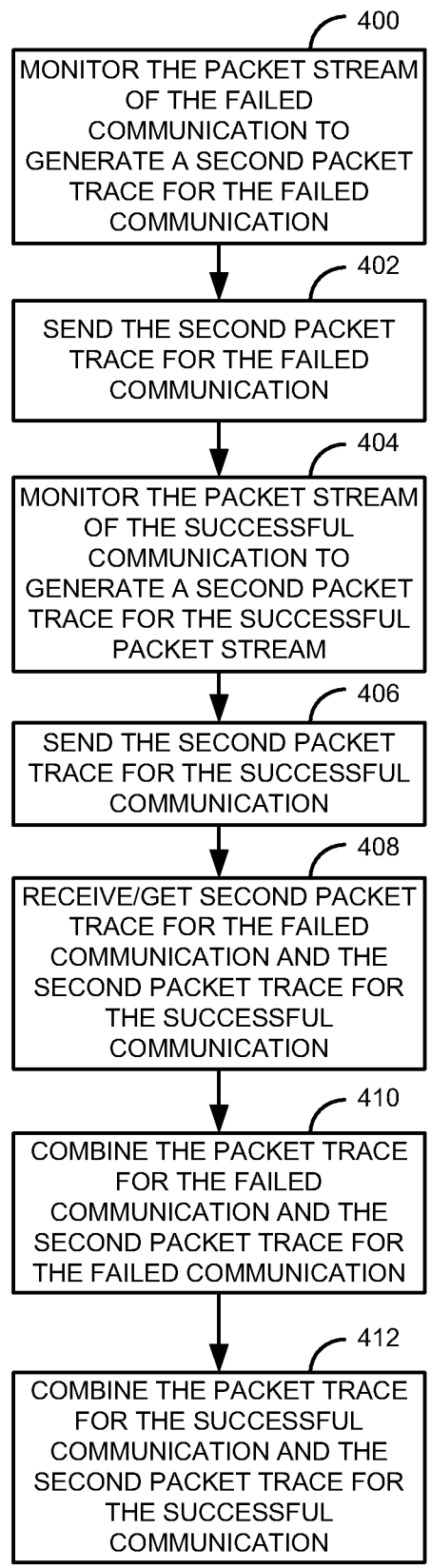
FIG. 4 is a flow diagram of a method for getting additional packet traces to compare different communications.

FIG. 4 is a flow diagram of a method for getting additional packet traces to compare different communications. A network analyzer 120 monitors 400 a packet stream of the failed communication to generate a second packet trace of the failed communication. The network analyzer 120 that monitors the failed packet stream to generate the second packet trace for the failed communication will typically be at a different point in the network 110 or in a different communication device 101 involved in the failed communication path 126 than the network analyzer 120 in step 200. The network analyzer 120 sends 402 the second packet trace of the failed communication to the network interface 131.

A network analyzer 120 monitors 404 the packet stream of the successful communication to generate a second packet trace of the successful communication. The network analyzer 120 that monitors the second packet trace for the successful communication will typically be at a different point in the network 110 or in a different communication device 101 involved in the successful communication path 125 than the network analyzer 120 in step 202. The network analyzer 120 sends 406 the second packet trace of the successful communication to the network interface 131.

The network interface 131 receives 408 the second packet trace of the failed communication and the second packet trace of the successful communication. The packet trace manager 132 combines 410 the second packet trace of the failed communication with the (first) packet trace of the failed communication. For example, a packet trace is typically a text representation of the packets. Combining 410 the packet traces would be merging the two packet traces into a single text file. The packet trace manager 132 combines 412 the second packet trace of the successful communication with the (first) packet trace of the successful communication.

To illustrate how this would work, consider the following example. Assume that the failed communication and the successful communication are as shown in FIG. 1. Also assume that the first packet trace of the failed communication is taken by network analyzer 120D (during step 300), the first packet trace of the successful communication is taken by network analyzer 120A (during step 304), the second packet trace of the failed communication is taken by network analyzer 120E (during step 400), and the second packet trace of the successful communication is also taken by network analyzer 120E (during step 404).

Network analyzer 120 D sends 302 the first packet trace of the failed communication to the network interface 131. Network analyzer 120A sends 306 the first packet trace of the successful communication to the network interface 131. Network analyzer 120E sends 402 the second packet trace of the failed communication to the network interface 131. Network analyzer 120E sends 406 the second packet trace of the successful communication to the network interface 131. The network interface 131 gets (receives) the four packet traces (from steps 200, 202, and 408). The packet trace manager 132 combines 410 the second packet trace for the failed communication with the packet trace for the failed communication. The packet trace manager 132 combines 412 the second packet trace for the successful communication with the packet trace for the successful communication. The packet trace manager 132 then completes steps 204-210 on the packet trace of the failed communication and the packet trace of the successful communication.

Figure 5:
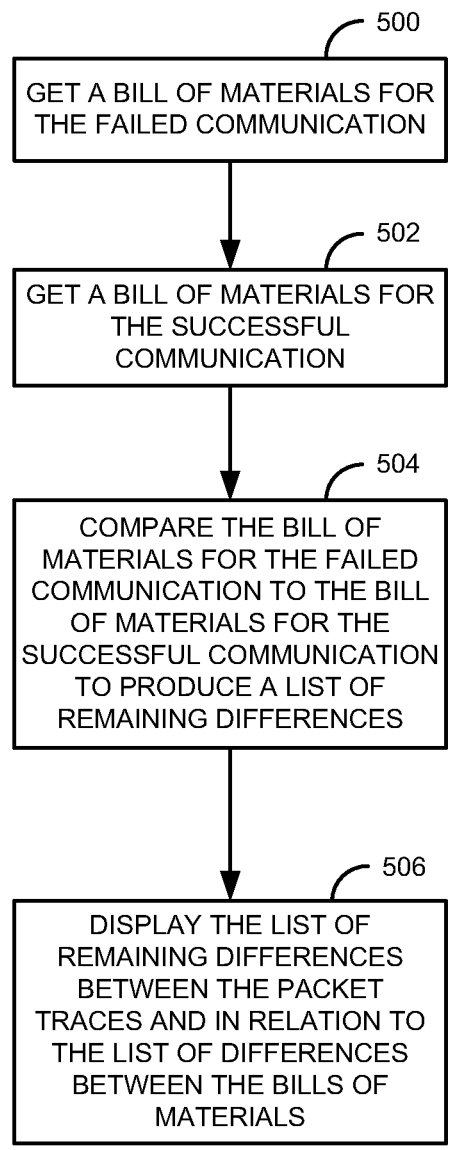
FIG. 5 is a flow diagram of a method for getting a bill of materials for each of the different communications and comparing the differences between the bills of materials.

FIG. 5 is a flow diagram of a method for getting a bill of materials for each of the different communications and comparing the differences between the bills of materials. A bill of materials is a listing of the communication devices 101, network elements 112, software applications, trunks, and the like involved in the communication. A system and method for determining a bill of materials for a communication is disclosed in U.S. patent application Ser. No. 12/433,630, which is incorporated herein by reference.

The packet trace manager 132 gets 500 a bill of materials for the failed communication. The packet trace manager 132 gets 502 a bill of materials for the successful communication. The packet trace manager 132 compares 504 the bill of materials for the failed communication with the bill of materials for the successful communication to produce a list of remaining differences between the bill of materials for the failed communication and the bill of materials for the successful communication. The list of remaining differences between the packet trace of the failed communication and the packet trace of the successful communication is displayed 506 in relation to the list of differences between the bills of materials. One way of showing the list of differences between the packet traces and the bill of materials can be by displaying packets from the devices/elements that are not common between the two packet traces. This way a user may more easily determine a potential problem in a device/element.

This allows a user to see differences in the bills of materials. Referring to FIG. 1, for example, using this technique the user could see that communication device 101B, network element 112B, and network element 112C are common elements between the bill of materials for the failed communication and the successful communication. The user could also see that communication device 101A, communication device 101C, network element 112A, and network element 112D are not common elements in the failed communication and the successful communication. The common/different elements in the bills of materials can be displayed in relation to the differences in the packet traces. This allows the user to quickly diagnose potential network elements 112 causing the failed communication, congestion problems at a network element 112, configuration issues in network elements 112, bad trunks, a failure in a communication device 101, and the like; this allows the user to quickly resolve the issue associated with the failed communication.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated Figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for comparing communications comprising:
a processor getting a first packet trace of a failed communication, wherein the failed communication was sent through a first network;
the processor getting a second packet trace of a successful communication, wherein the successful communication was also sent through the first network, wherein the first packet trace of the failed communication and the second packet trace of the successful communication are generated from packets of a common communications protocol, and wherein the failed communication and the successful communication involve at least one common element of the first network;
the processor identifying a common field in both the first packet trace and the second packet trace, wherein the common field is defined by the common communications protocol;
the processor changing the identified common field in at least one of the first packet trace of the failed communication or the second packet trace of the successful communication to produce a same value in the identified common field of both the first packet trace and the second packet trace;
the processor comparing the updated first packet trace and second packet trace to produce a list of all remaining differences between the first packet trace of the failed communication and the second packet trace of the successful communication;
providing the list of remaining differences;
the processor getting a bill of materials of the failed communication, wherein the bill of materials for the failed communication comprises one or more of: devices, software elements, and communication links in a communication path of the failed communication;
the processor getting a bill of materials of the successful communication, wherein the bill of materials for the successful communication comprises one or more of: devices, software elements and communication links in a communication path of the successful communication;
the processor comparing the bill of materials of the failed communication with the bill of materials of the successful communication to produce a list of differences between the bill of materials of the failed communication and the bill of materials of the successful communication; and
displaying the list of differences between the first packet trace of the failed communication and the second packet trace of the successful communication in relation to the list of differences between the bill of materials of the failed communication and the bill of materials of the successful communication.

2. The method of claim 1, wherein the identified field is less likely to identify a cause of the failed communication.

3. The method of claim 1, wherein the common communications protocol is one of Open System Interconnect 7 layer model, Internet Protocol (IP), User Datagram Protocol (UDP), Transmission Control Protocol (TCP), File Transfer Protocol (FTP), Hypertext Transfer Protocol (HTTP), Session Initiation Protocol (SIP), H.323, Integrated Services Digital Network (ISDN), a video protocol, Real-time Transport Protocol (RTP), or RealTime Streaming Protocol (RTSP).

4. The method of claim 1, further comprising the steps of:
monitoring a packet stream of the failed communication to generate the first packet trace of the failed communication; and
monitoring a packet stream of the successful communication to generate the second packet trace of the successful communication.

5. The method of claim 1, further comprising the steps of:
monitoring a packet stream of the failed communication to generate a plurality of packet traces of the failed communication;
combining the plurality of failed packet traces to get the first packet trace of the failed communication;
monitoring a packet stream of the successful communication to generate a plurality of packet traces of the successful communication; and
combining the plurality of successful packet traces to get the second packet trace of the successful communication.

6. The method of claim 1, further comprising displaying the list of remaining differences to a user.

7. The method of claim 1, wherein the identifying, changing, and comparing steps are repeated by identifying an additional common field in the common communications protocol to make similar across the first packet trace and the second packet trace.

8. The method of claim 1, further comprising the steps of:
getting a third packet trace for an additional successful communication, wherein the first packet trace for the failed communication and the third packet trace for the additional successful communication are generated from packets of the common communications protocol;
repeating the identifying, changing, and comparing steps for the failed communication and the additional successful communication.

9. The method of claim 1, wherein the common field is identified based on one or more network layers.

10. The method of claim 1, wherein the list of remaining differences is further reduced by analyzing the list of remaining differences based on additional criteria selected from the group comprising: time differences, previously determined irrelevant errors, duplicate packets, and payload differences.

11. The method of claim 1, wherein the common communications protocol is a layer of a layered protocol.

12. The method of claim 1, wherein the identified field is at least one item selected from the group comprising: a communication device, a router, a server, a software application, a Private Branch Exchange, a trunk, a switch, and a network.

13. The method of claim 1, wherein changing the identified field in at least one of the first packet trace or the second packet trace is accomplished by at least one of the following: removing the one or more fields from the first and second packet traces, and replacing the one or more fields in at least one of the first and second packet traces with an identical value.

14. A system for comparing communications comprising:
a network interface configured to get a first packet trace and a second packet trace, wherein one of the first packet trace and the second packet trace is of a failed communication and one of the first packet trace and the second packet trace is of a successful communication, wherein the first packet trace and the second packet trace are generated from packets of a common communications protocol, wherein the failed communication and the successful communication were sent through a first network, and wherein the failed communication and the successful communication involve at least one common element of the first network;
a packet trace manager configured to:
identify a common field in both the first packet trace and the second packet trace, wherein the common field is defined by the common communications protocol;
change the common field in the first packet trace to produce a same value in the common field of both the first packet trace and the second packet trace; and
compare the updated first packet trace to the second packet trace to produce a list of all remaining differences between the first and second packet traces;
get a bill of materials of the failed communication, wherein the bill of materials for the failed communication comprises one or more of: devices, software elements, and communication links in a communication path of the failed communication;
get a bill of materials of the successful communication, wherein the bill of materials for the successful communication comprises one or more of: devices, software elements and communication links in a communication path of the successful communication; and
compare the bill of materials of the failed communication with the bill of materials of the successful communication to produce a list of differences between the bill of materials of the failed communication and the bill of materials of the successful communication; and
a display configured to display the list of remaining differences between either the first or second packet trace of the failed communication and either the first or second packet trace of the successful communication in relation to the list of differences between the bill of materials of the failed communication and the bill of materials of the successful communication.

15. The system of claim 14, wherein the identified field is less likely to identify a cause of the failed communication.

16. The system of claim 14, wherein at least two network elements are common to both the failed communication and the successful communication.

17. The system of claim 14, further comprising one or more network analyzers configured to monitor a packet stream of the failed communication to generate either the first or second packet trace of the failed communication, send either the first or second packet trace of the failed communication to the network interface, monitor a packet stream of the successful communication to generate either the first or second packet trace of the successful communication, and send either the first or second packet trace of the successful communication to the network interface.

18. The system of claim 14, further comprising at least one network analyzer for monitoring a packet stream of the failed communication to generate a plurality of packet traces of the failed communication and for monitoring a packet stream of the successful communication to generate a plurality of packet traces of the successful communication and wherein the packet trace manager is further configured to combine the plurality of failed packet traces to get either the first or second packet trace of the failed communication and combine the plurality of successful packet traces to get either the first or second packet trace of the successful communication.

19. The system of claim 14, further comprising a display configured to display the list of remaining differences to a user.

20. The system of claim 14, wherein the packet trace manager is further configured to identify an additional field in the common communications protocol.

21. The system of claim 14, wherein the packet network interface is further configured to get a third packet trace for an additional successful communication and wherein either the first or second packet trace for the failed communication and the third packet trace for the additional successful communication are generated from packets of the common communications protocol.

22. The system of claim 14, wherein the field is identified based on one or more network layers.

23. The system of claim 14, wherein the list of remaining differences is further reduced by analyzing the list of remaining differences based on additional criteria selected from the group comprising: time differences, previously determined irrelevant errors, duplicate packets, and payload differences.

24. The system of claim 14, wherein the common communications protocol comprises one or more items selected from the group comprising: Internet Protocol, User Datagram Protocol, Transmission Control Protocol, Session Initiation Protocol, H.323, Integrated Services Digital Network, a video protocol, Hyper Text Markup Language, Extended Markup Language, Real-time Transport Protocol, and Real-Time Streaming Protocol.

25. The system of claim 14, wherein the identified field is at least one item selected from the group comprising: a communication device, a router, a server, a software application, a Private Branch Exchange, a trunk, a switch, and a network.

26. The system of claim 14, wherein updating the field in either the first or second packet trace for the failed communication and either the first or second packet trace for the successful communication is accomplished by at least one of the following: removing the one or more fields in the first and second packet traces and replacing the one or more fields in the first and second packet traces with an identical value.

27. A non-transitory computer readable medium having computer-executable instructions stored thereon, the computer-executable instructions causing a processor to execute a method for comparing communications, the instructions comprising:

instructions to get a first packet trace of a failed communication, wherein the failed communication was sent through a first network;

instructions to get a second packet trace of a successful communication, wherein the successful communication was also sent through the first network, wherein the first packet trace and the second packet trace are generated from packets of a common communications protocol, and wherein the failed communication and the successful communication involve at least one common element of the first network;

instructions to identify a common field in both the first packet trace and the second packet trace, wherein the common field is defined by the common communications protocol;

instructions to change the common field in the first packet trace to produce a same value in the common field of both the first packet trace and the second packet trace;

instructions to compare the updated first packet trace to the second packet trace to produce a list of remaining differences between the first and second packet traces;

instructions to get a bill of materials of the failed communication, wherein the bill of materials for the failed communication comprises one or more of: devices, software elements, and communication links in a communication path of the failed communication;

instructions to get a bill of materials of the successful communication, wherein the bill of materials for the successful communication comprises one or more of: devices, software elements and communication links in a communication path of the successful communication;

instructions to compare the bill of materials of the failed communication with the bill of materials of the successful communication to produce a list of differences between the bill of materials of the failed communication and the bill of materials of the successful communication; and instructions to display the list of differences between the first packet trace of the failed communication and the second packet trace of the successful communication in relation to the list of differences between the bill of materials of the failed communication and the bill of materials of the successful communication.

\* \* \* \* \*